United States Patent
Lee (10) Patent No.: US 12,189,055 B2
(45) Date of Patent: Jan. 7, 2025

(54) RADAR APPARATUS AND METHOD FOR CLASSIFYING OBJECT

(71) Applicant: BITSENSING INC., Seoul (KR)

(72) Inventor: Jae Eun Lee, Seoul (KR)

(73) Assignee: BITSENSING INC., Seoul (KR)

( * ) Notice: Subject to any disclaimer, the term of this patent is extended or adjusted under 35 U.S.C. 154(b) by 0 days.

(21) Appl. No.: 18/504,399

(22) Filed: Nov. 8, 2023

(65) Prior Publication Data

US 2024/0103132 A1 Mar. 28, 2024

Related U.S. Application Data (63) Continuation of application No. 17/208,056, filed on Mar. 22, 2021, now Pat. No. 11,846,725.

(30) Foreign Application Priority Data

Mar. 31, 2020 (KR) .......... 10-2020-0038964
Mar. 18, 2021 (KR) .......... 10-2021-0035112

(51) Int. Cl.
*G01S 7/41* (2006.01)
*G01S 13/86* (2006.01)
(Continued)

(52) U.S. Cl.
CPC ............ *G01S 7/417* (2013.01); *G01S 13/867* (2013.01); *G01S 13/931* (2013.01);
(Continued)

(58) Field of Classification Search
CPC .......... G01S 13/931; G01S 13/867; G01S 2013/93271; G01S 7/417; G06F 18/251; G05D 1/0088; G06V 10/762; G06V 20/58; G06V 10/803; G06V 10/774; G06V 10/764
See application file for complete search history.

(56) References Cited

U.S. PATENT DOCUMENTS 11,151,447 B1 * 10/2021 Chen ............ G01S 7/4091
11,354,913 B1 * 6/2022 Houston ............ G06F 18/24
(Continued)

FOREIGN PATENT DOCUMENTS

DE 19649618 A1 6/1998
JP H10239428 A 9/1998
(Continued)

OTHER PUBLICATIONS

Extended European Search Report for EP application No. 21781424.3 dated Feb. 20, 2024.
(Continued)

*Primary Examiner* — Peter M Bythrow
(74) *Attorney, Agent, or Firm* — Dinsmore & Shohl LLP; Yongsok Choi, Esq.

(57) ABSTRACT

A radar apparatus includes a transceiver that transmits a radar signal and receives a radar signal reflected from an object; a signal processing unit that processes the reflected radar signal to detect the object; a fusion data generation unit that generates fusion data based on radar data and camera data; and a classification unit that classifies the detected object using an artificial intelligence module trained based on the generated fusion data.

12 Claims, 8 Drawing Sheets

(51) Int. Cl.

| | |
|---|---|
| *G01S 13/931* | (2020.01) |
| *G05D 1/00* | (2024.01) |
| *G06F 18/25* | (2023.01) |
| *G06V 10/762* | (2022.01) |
| *G06V 10/764* | (2022.01) |
| *G06V 10/774* | (2022.01) |
| *G06V 10/80* | (2022.01) |
| *G06V 20/58* | (2022.01) |

(52) U.S. Cl.
 CPC ......... *G05D 1/0088* (2013.01); *G06F 18/251* (2023.01); *G06V 10/762* (2022.01); *G06V 10/764* (2022.01); *G06V 10/774* (2022.01); *G06V 10/803* (2022.01); *G06V 20/58* (2022.01); *G01S 2013/93271* (2020.01)

(56) References Cited

U.S. PATENT DOCUMENTS

| | | | | |
|---|---|---|---|---|
| 11,361,554 | B2* | 6/2022 | Janardhana | G06V 10/454 |
| 11,630,197 | B2* | 4/2023 | Unnikrishnan | G06F 18/23 |
| | | | | 382/104 |
| 2018/0032082 | A1* | 2/2018 | Shalev-Shwartz | |
| | | | | G01C 21/3453 |
| 2018/0082137 | A1 | 3/2018 | Melvin et al. | |
| 2018/0137373 | A1* | 5/2018 | Rasmusson, Jr. | G06T 7/20 |
| 2018/0253980 | A1 | 9/2018 | Mohamadi | |
| 2018/0275657 | A1* | 9/2018 | You | G05B 23/0229 |
| 2019/0009794 | A1* | 1/2019 | Toyoda | B60W 50/12 |
| 2019/0049967 | A1* | 2/2019 | Lim | G05D 1/0221 |
| 2019/0050692 | A1* | 2/2019 | Sharma | G06F 18/254 |
| 2019/0065878 | A1* | 2/2019 | Zeng | G06V 20/56 |
| 2019/0120955 | A1* | 4/2019 | Zhong | G01S 13/931 |
| 2019/0147331 | A1 | 5/2019 | Arditi | |
| 2019/0258878 | A1* | 8/2019 | Koivisto | G06N 3/084 |
| 2019/0383904 | A1 | 12/2019 | Harrison | |
| 2019/0384303 | A1 | 12/2019 | Muller et al. | |
| 2019/0391235 | A1* | 12/2019 | Harrison | G01S 7/003 |
| 2020/0019158 | A1* | 1/2020 | Kang | G08G 1/202 |
| 2020/0174112 | A1* | 6/2020 | Xing | G01S 7/41 |
| 2020/0175315 | A1* | 6/2020 | Gowaikar | G06V 10/80 |
| 2020/0348396 | A1* | 11/2020 | Bialer | G01S 7/417 |
| 2021/0117701 | A1* | 4/2021 | Janardhana | G06F 18/24 |
| 2021/0208272 | A1* | 7/2021 | Lavian | H03L 7/091 |
| 2021/0231794 | A1* | 7/2021 | Song | G01S 13/867 |
| 2021/0241026 | A1* | 8/2021 | Deng | G01S 7/497 |
| 2021/0255304 | A1* | 8/2021 | Fontijne | G06V 20/58 |
| 2021/0295113 | A1* | 9/2021 | Sless | G06F 18/25 |
| 2021/0345286 | A1* | 11/2021 | Takeuchi | G01S 13/867 |
| 2021/0354634 | A1* | 11/2021 | Yoon | B60R 16/023 |
| 2021/0362740 | A1* | 11/2021 | Mujica | B60W 60/001 |
| 2022/0119007 | A1* | 4/2022 | Schwindt | G01S 13/865 |
| 2022/0146992 | A1* | 5/2022 | Miller | G05B 15/02 |
| 2022/0180628 | A1* | 6/2022 | Handa | G06V 10/96 |
| 2022/0400403 | A1* | 12/2022 | Vassilovski | G08G 1/093 |
| 2023/0072637 | A1* | 3/2023 | Xia | G01S 13/931 |
| 2023/0106673 | A1* | 4/2023 | Asghar | A61B 5/163 |
| | | | | 382/104 |

FOREIGN PATENT DOCUMENTS

| | | |
|---|---|---|
| KR | 1020190140984 A | 12/2019 |
| KR | 1020200132137 A | 11/2020 |

OTHER PUBLICATIONS

Felix Nobis, et al., "A Deep Learning based Radar and Camera Sensor Fusion Architecture for Object Detection," Oct. 17, 2019.

* cited by examiner

RADAR APPARATUS AND METHOD FOR CLASSIFYING OBJECT

CROSS-REFERENCE TO RELATED APPLICATION(S)

This application is a continuation of U.S. patent application Ser. No. 17/208,056 filed on Mar. 22, 2021, which claims the benefit under 35 USC 119(a) of Korean Patent Application No. 10-2020-0038964 filed on 31 Mar. 2020 and Korean Patent Application No. 10-2021-0035112 filed on 18 Mar. 2021, in the Korean Intellectual Property Office, the entire disclosures of which are incorporated herein by reference for all purposes.

TECHNICAL FIELD

The present disclosure relates to a radar apparatus and method for classifying an object.

BACKGROUND

An automotive radar functions to provide a driver with location information of nearby vehicles and obstacles present in front of, beside and behind the driver's vehicle.

Such an automotive radar has a high range accuracy in detecting an object and is not affected by driving conditions of the vehicle (for example, bad weather, night time, etc.) and thus provides stable object detection performance. Also, the automotive radar can measure the speed of an object and thus can distinguish whether the object is moving or stationary.

However, the automotive radar has a lower horizontal resolution than an automotive camera or a Lidar. Thus, it is difficult to estimate and classify the shape of an object using the automotive radar. Also, in an annotation process for obtaining ground truth used for artificial intelligence training of the automotive radar, it is difficult for the driver to identify an object based only on the measurement result (for example, location and speed) of the object detected by the automotive radar. Therefore, without additional information from other sensors, it is difficult to classify the object detected by the automotive radar.

Meanwhile, the automotive camera has a higher horizontal resolution than the automotive radar and thus has been useful to recognize and classify an object.

However, the automotive camera is capable of measuring the distance to an object by means of stereo vision and the like, but has a low range accuracy and is not suitable for detecting an object at a remote distance. Also, the automotive camera is affected by driving conditions of the vehicle and thus provides degraded object detection performance in bad weather or at night time.

PRIOR ART DOCUMENT

Patent Document 1: Korean Patent Laid-open Publication No. 2020-0132137 (published on Nov. 25, 2020)

SUMMARY

In view of the foregoing, the present disclosure provides a technique for generating fusion data based on radar data and camera data and classifying a detected object through artificial intelligence modules trained based on the generated fusion data.

The problems to be solved by the present disclosure are not limited to the above-described problems. There may be other problems to be solved by the present disclosure According to at least one example embodiment, a radar apparatus installed in a vehicle may include a transceiver that transmits a radar signal to an outside of the vehicle and receives a radar signal reflected from an object; a signal processing unit that processes the reflected radar signal to detect the object; a fusion data generation unit that generates fusion data based on radar data and camera data; and a classification unit that classifies the detected object using an artificial intelligence module trained based on the generated fusion data.

According to at least one other example embodiment, a method for classifying an object by a radar apparatus installed in a vehicle, may include transmitting a radar signal to an outside of the vehicle; receiving a radar signal reflected from an object; processing the reflected radar signal to detect the object; generating fusion data based on radar data and camera data; and classifying the detected object using an artificial intelligence module trained based on the generated fusion data.

This summary is provided by way of illustration only and should not be construed as limiting in any manner. Besides the above-described exemplary embodiments, there may be additional exemplary embodiments that become apparent by reference to the drawings and the detailed description that follows.

According to any one of the above-described embodiments of the present disclosure, it is possible to generate fusion data based on radar data and camera data and classify a detected object through artificial intelligence modules trained based on the generated fusion data.

Also, according to the present disclosure, the artificial intelligence module can be trained in real time by using the fusion data, and, thus, the trained artificial intelligence module can improve object detection and classification performance.

Further, according to the present disclosure, it is possible to generate fusion data based on data from a radar that provides stable object detection performance even in bad weather or at night time and improve object detection performance of an artificial intelligence camera module based on the fusion data.

Furthermore, according to the present disclosure, a radar apparatus can stably detect and classify an object using the artificial intelligence modules trained based on the fusion data even in a situation, such as bad weather or night time, where it is difficult for a camera to identify an object.

Moreover, according to the present disclosure, the radar apparatus can use the artificial intelligence modules trained based on the fusion data to later classify an object, which has been detected by the radar apparatus, without using a camera.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

In the present specification, some of operations or functions described as being performed by a device may be performed by a server connected to the device. Likewise, some of operations or functions described as being performed by a server may be performed by a device connected to the server.

Hereinafter, embodiments of the present disclosure will be explained in detail with reference to the accompanying drawings.

Figure 1:
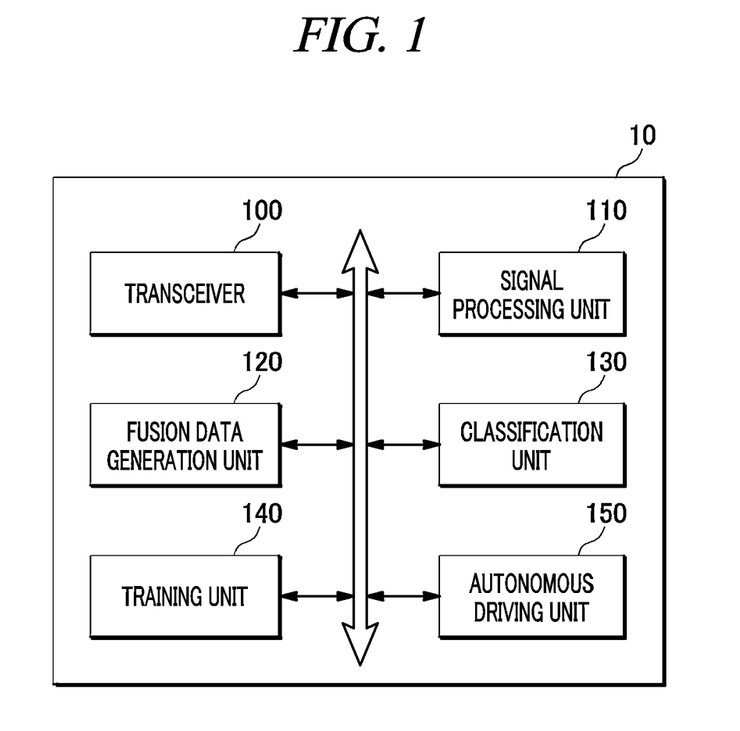
FIG. 1 is a block diagram of a radar apparatus according to an embodiment of the present disclosure.

FIG. 1 is a block diagram of a radar apparatus 10 according to an embodiment of the present disclosure.

Referring to FIG. 1, the radar apparatus 10 may include a transceiver 100, a signal processing unit 110, a fusion data generation unit 120, a classification unit 130, a training unit 140 and an autonomous driving unit 150. However, the radar apparatus 10 illustrated in FIG. 1 is just one of embodiments of the present disclosure and can be modified in various ways based on the components illustrated in FIG. 1.

The transceiver 100 may transmit a radar signal to the outside of a vehicle and receive a radar signal reflected from an object. For example, the object may include an obstacle, a moving body, a pedestrian, etc. located in front of, beside and behind the vehicle.

The signal processing unit 110 may process the reflected radar signal to detect the object. Here, the reflected radar signal is received while the vehicle equipped with the radar apparatus 10 is driving.

Figure 2A:
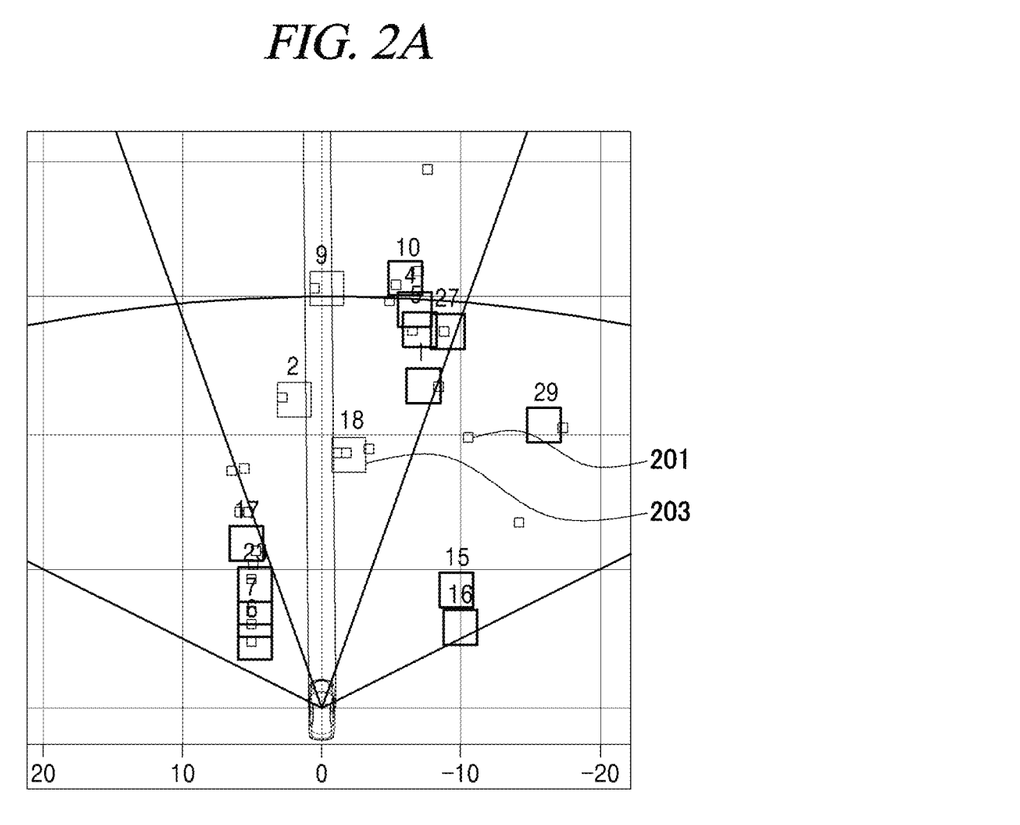
FIG. 2A is diagram for explaining data used to generate fusion data according to an embodiment of the present disclosure.

Specifically, the signal processing unit 110 may perform a signal processing to the reflected radar signal to detect the object. For example, referring to FIG. 2A, the signal processing unit 110 may extract a plurality of point cloud data 201 (small boxes) constituting at least one object based on the reflected radar signal, and derive a detection result value of the object by using the extracted plurality of point cloud data 201. Here, the detection result value of the object may include location information and speed information of the object and angle information between the object and the vehicle (vehicle equipped with the radar apparatus 10) derived based on the plurality of point cloud data 201.

The signal processing unit 110 may recognize the object based on the detection result value of the object. The signal processing unit 110 may determine whether or not the detected object is a real object based on the detection result value of the object, and derive a recognition result value of the object based on the determination. For example, referring to FIG. 2A, the signal processing unit 110 may cluster the plurality of point cloud data 201, estimate a clustered point cloud set 203 (large square box) as a real object and regard the clustered point cloud set 203 as a recognition result value of the object. Further, the signal processing unit 110 may track the clustered point cloud set and derive the tracking result as a recognition result value of the object. Furthermore, the signal processing unit 110 may correct a moving speed of the real object corresponding to the clustered point cloud set depending on whether the vehicle is moving and derive the corrected result as a recognition result value of the object.

The signal processing unit 110 may generate radar data based on a fast Fourier transform value of the reflected radar signal, the detection result value of the object and the recognition result value of the object.

Figure 2B:
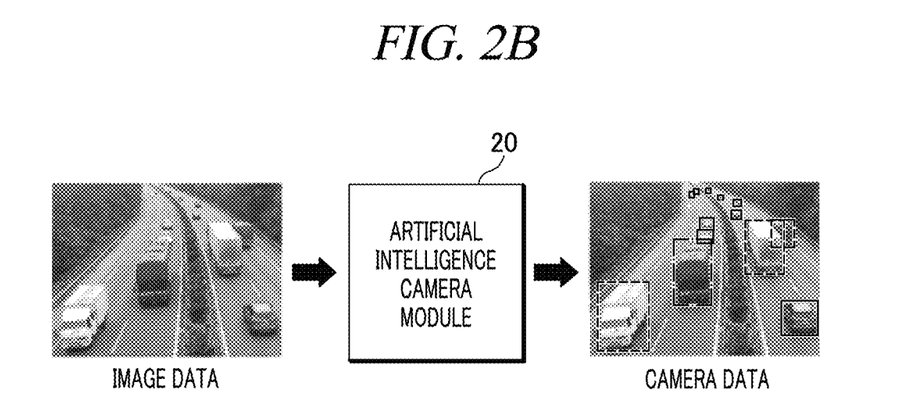
FIG. 2B is diagram for explaining data used to generate fusion data according to an embodiment of the present disclosure.

An image processing unit (not shown) may detect and classify the object based on image data received from a camera installed in the vehicle. For example, referring to FIG. 2B, the image processing unit (not shown) may input the image data into an artificial intelligence camera module 20 and then derive camera data including a detection result value (for example, location information of the object, etc.) and a classification result value (for example, vehicle type information of the object) derived by the artificial intelligence camera module 20. Here, the image processing unit (not shown) may recognize the object from the image data through the artificial intelligence camera module 20 and set a bounding box for the recognized object to search for the location of the recognized object. Further, the image processing unit (not shown) may determine which of a plurality of categories (for example, truck, bus, sedan, etc.) the object (for example, vehicle) recognized through the artificial intelligence camera module 20 belongs to and then classify the recognized object into the corresponding category.

The fusion data generation unit 120 may generate fusion data based on the radar data and the camera data.

Herein, the radar data may include data derived from a radar signal, such as a fast Fourier transform value of the radar signal reflected from the object, a detection result value of the object, a recognition result value of the object and the like. Herein, the camera data may be derived through the artificial intelligence camera module and may include a detection result value of an object included in image data generated by the camera installed in the vehicle and a classification result value of the object.

Figure 2C:
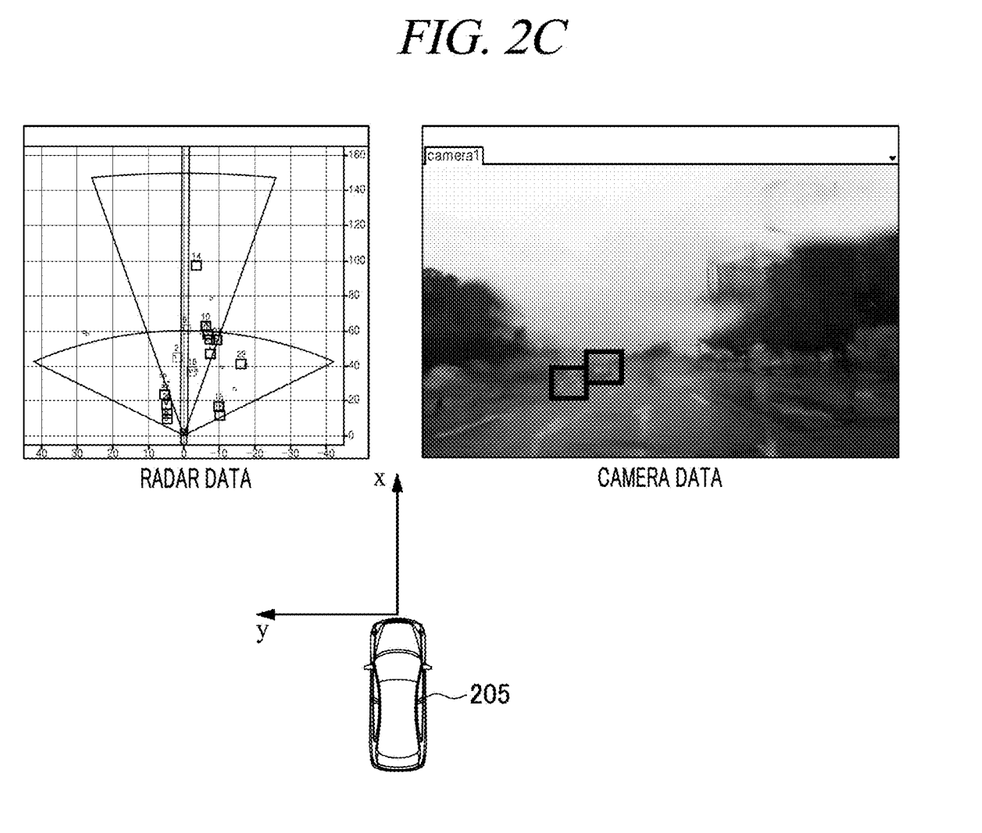
FIG. 2C is diagram for explaining data used to generate fusion data according to an embodiment of the present disclosure.

The fusion data generation unit 120 may project the camera data to a radar coordinate system of the radar apparatus 10 and match the camera data and the radar data projected to the radar coordinate system for each target to generate fusion data. For example, referring to FIG. 2C, the fusion data generation unit 120 may transform the location information of the object included in the camera data into a radar coordinate system of the radar apparatus 10 installed in a vehicle 205 (for example, an XYZ coordinate system around the vehicle 205) and check whether the coordinates of the object included in the camera data transformed into the radar coordinate system are similar to the coordinates of the object included in the radar data. In this case, the transformation into the radar coordinate system may be performed to compensate for a location error if there is a location error between the camera data and the radar data. Then, if the coordinates of the object included in the camera data transformed into the radar coordinate system are similar to the coordinates of the object included in the radar data, the fusion data generation unit 120 may recognize the object included in the camera data and the object included in the radar data as the same one and match each other.

Meanwhile, if the location error between the camera data and the radar data is less than a threshold value, the fusion data generation unit 120 does not project the camera data to the radar coordinate system of the radar apparatus 10, but may match the camera data and the radar data for each target to generate fusion data.

The fusion data may be used to obtain a classification result with high reliability through mutual matching between the camera data and the radar data and cumulative statistics over time.

The advantage of the radar apparatus 10 is that it has high range and velocity accuracy and can quickly derive a detection result. The advantage of the camera is that it has high horizontal resolution and can distinguish the types of vehicles (for example, truck, bus, sedan, motorcycle, etc.). According to the present disclosure, it is possible to generate fusion data with high accuracy for an object detected by the camera and the radar apparatus 10 by using the advantages of the camera and the radar apparatus 10 and complementing the disadvantages thereof.

Figure 3:
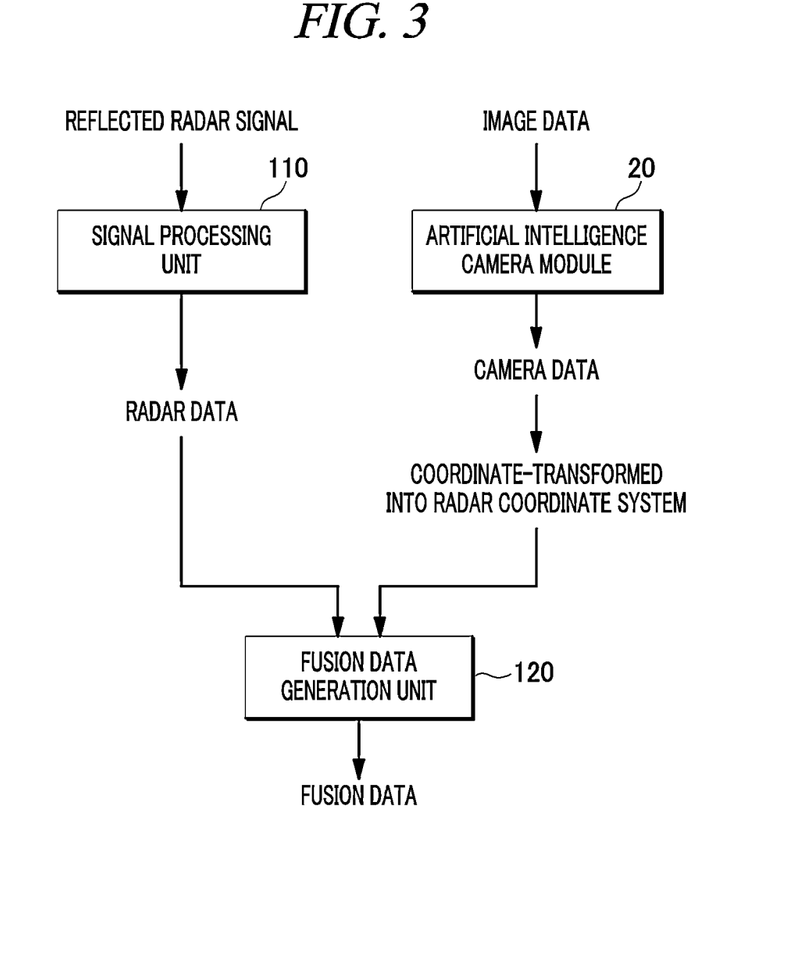
FIG. 3 is a diagram for explaining a process for generating fusion data according to an embodiment of the present disclosure.

FIG. 3 is a diagram for explaining a process for generating fusion data. Referring to FIG. 3, the signal processing unit 110 may generate radar data based on a radar signal reflected from an object. The image processing unit (not shown) may generate camera data based on image data through the artificial intelligence camera module 20. Here, the camera data may be coordinate-transformed into a radar coordinate system so as to be matched with the radar data for each target. The fusion data generation unit 120 may generate fusion data using the radar data and the camera data transformed into the radar coordinate system.

Figure 5:
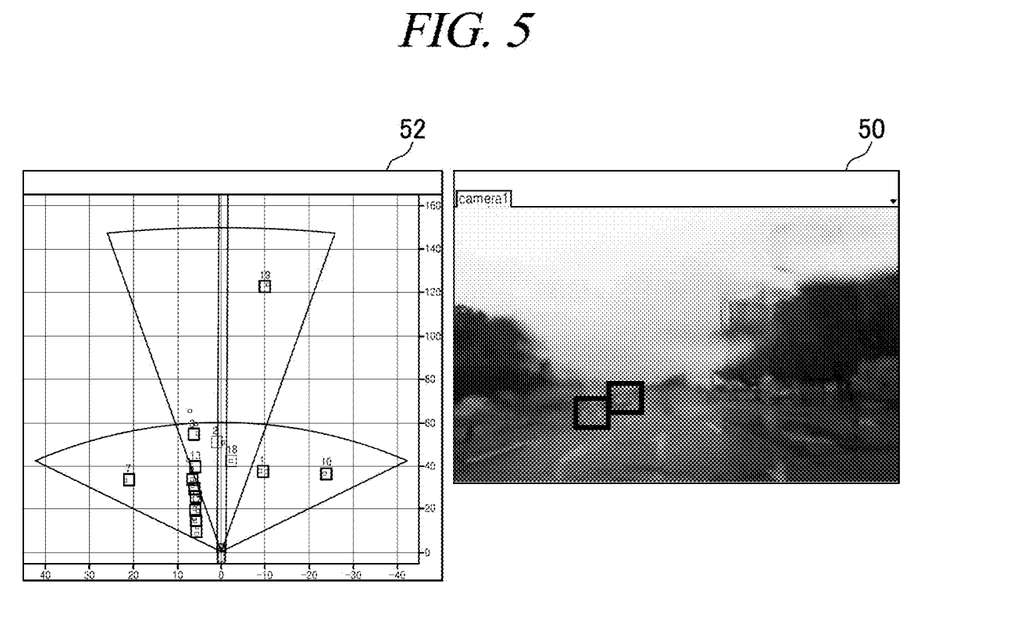
FIG. 5 is a diagram for explaining a method for generating fusion data depending on a driving condition of a vehicle according to an embodiment of the present disclosure.

Meanwhile, the fusion data generation unit 120 may generate fusion data by analyzing driving conditions of a vehicle while the vehicle is driving and giving weightings to the camera data and the radar data based on the analyzed driving conditions. Here, the driving conditions refers to external environmental factors that affect the vehicle while the vehicle is driving and may include various types of driving condition information (for example, rainy weather, foggy weather, night driving, etc.). For example, referring to FIG. 5, if it is rainy (or foggy) when the vehicle is driving, the accuracy in detecting an object (for example, vehicle) using camera data 50 decreases. Therefore, in this case, the fusion data generation unit 120 may generate fusion data by giving a higher weighting to radar data 52 than to the camera data 50. Here, the fusion data generated by giving a higher weighting to the radar data 52 may be used for additional training by the training unit 140, and location information of the object may be estimated from the camera data 50 based on location information of the object included in the radar data 52.

Meanwhile, the training unit 140 may input radar data into an artificial intelligence radar module of the radar apparatus 10 to train the artificial intelligence radar module, and input image data into an artificial intelligence camera module of the camera to train the artificial intelligence camera module. Herein, the radar data may be generated while the vehicle is driving based on a reflected radar signal received while the vehicle is driving, and the image data may be generated while the vehicle equipped with the camera is driving.

The training unit 140 may input the radar data into the artificial intelligence radar module and train the artificial intelligence radar module so that the artificial intelligence radar module can perform a detection process and a classification process with respect to an object.

The training unit 140 may input the image data into the artificial intelligence camera module and train the artificial intelligence camera module so that the artificial intelligence camera module can derive camera data including a detection result value of the object and a classification result value of the object.

The radar apparatus and the camera installed in the vehicle may receive a radar signal while the vehicle is driving and generate image data in real time. Therefore, the camera data and the radar data used in the training unit 140 may be generated in real time based on the radar signal and the image data generated in real time. Further, the camera data and the radar data generated in real time are used in real time for basic training of the artificial intelligence modules and may be used in real time for additional training of the artificial intelligence modules.

When the fusion data are generated by the fusion data generation unit 120, the training unit 140 may additionally input the fusion data into the artificial intelligence radar module and the artificial intelligence camera module to additionally train the artificial intelligence radar module and the artificial intelligence camera module.

An object detection result obtained by the radar apparatus 10 is more stable than an object detection result obtained by the camera in bad weather or at night time. Also, the radar apparatus 10 is capable of limiting and classifying an object, which is detected as moving on a road at a predetermined speed or more based on ground speed information, into a specific class. Therefore, it is possible to use the radar data for training of the artificial intelligence camera module in bad weather or at night time.

The fusion data used for training may include, for example, vertical and horizontal location information of the detected object and object type information (for example, vehicle, truck, motorcycle, bicycle, pedestrian, etc.) classified by the previously trained artificial intelligence camera module.

Figure 4:
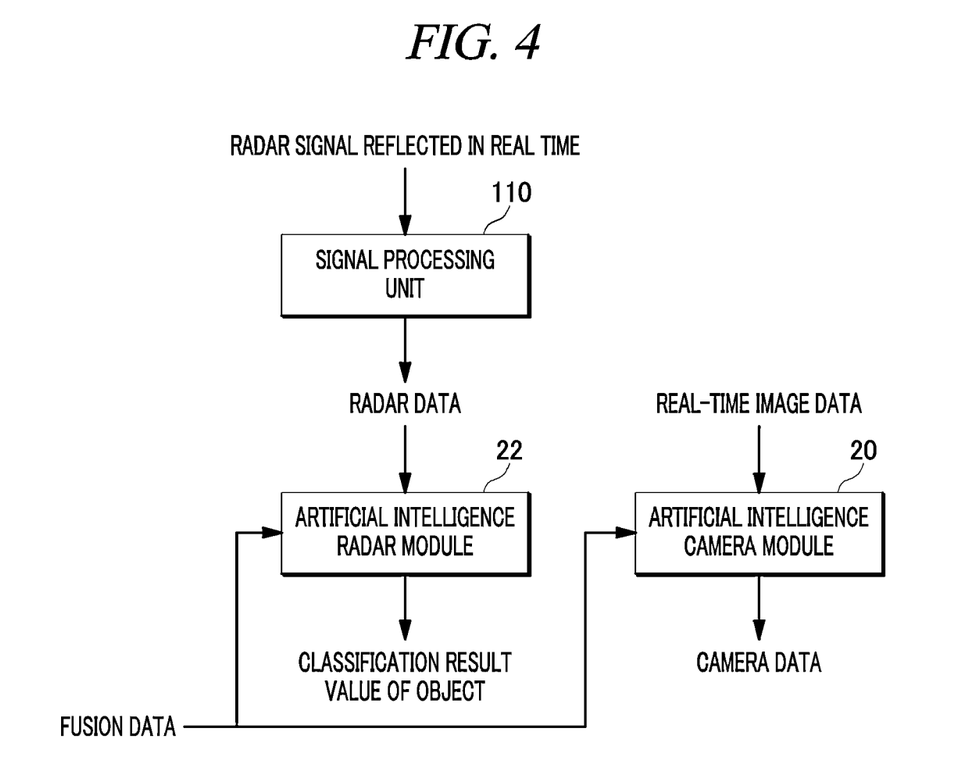
FIG. 4 is a diagram for explaining a process for training an artificial intelligence module according to an embodiment of the present disclosure.

For example, referring to FIG. 4, the training unit 140 may input the fusion data and radar data (radar data generated based on a reflected radar signal received in real time) into the artificial intelligence radar module 22 and additionally train the artificial intelligence radar module 22 so that the artificial intelligence radar module 22 can derive a classification result value of the object. Further, the training unit 140 may input the fusion data and real-time image data into the artificial intelligence camera module 20 and additionally train the artificial intelligence camera module so that the artificial intelligence camera module 20 can derive camera data including a detection result value of the object and a classification result value of the object.

Then, when the real-time image data are input into the additionally trained artificial intelligence camera module, real-time camera data may be derived by the artificial intelligence camera module.

That is, according to the present disclosure, it is possible to primarily train the artificial intelligence modules based on radar data and camera data serving as basic data. This is basic training for the artificial intelligence modules to have minimum performance. Further, according to the present disclosure, it is possible to secondarily train the artificial intelligence modules based on fusion data generated to complement the disadvantages of the radar data and the camera data, and, thus, it is possible to improve performance of the artificial intelligence modules. Particularly, according to the present disclosure, it is possible to effectively train the artificial intelligence radar module by suggesting a fusion data-based classification training method for radar data which it is difficult to annotate.

The classification unit 130 may classify the object detected by the radar apparatus 10 through the artificial intelligence modules trained based on the generated fusion data. Specifically, the classification unit 130 may classify the object detected by the radar apparatus 10 through the additionally trained artificial intelligence radar module.

Meanwhile, a performance measurement unit (not shown) may measure performance of the additionally trained artificial intelligence radar module based on a classification result value of the object derived through the additionally trained artificial intelligence radar module.

When a performance value of the artificial intelligence radar module exceeds a predetermined threshold value, the fusion data generation unit 120 may generate fusion data further based on the classification result value of the object derived through the artificial intelligence radar module.

Figure 6:
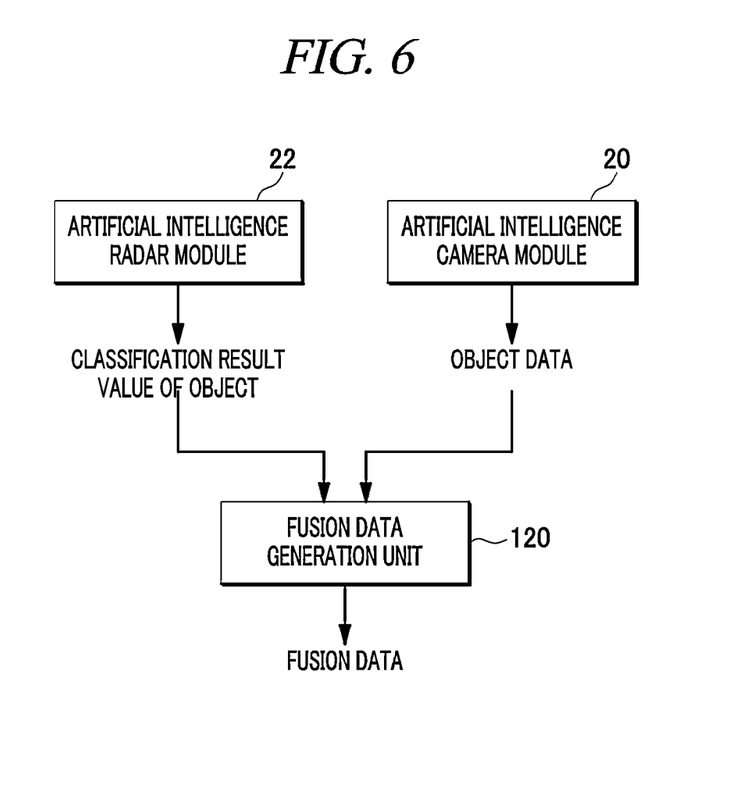
FIG. 6 is a diagram for explaining a method for generating fusion data depending on performance of an artificial intelligence radar module according to an embodiment of the present disclosure.

For example, referring to FIG. 6, when the performance value of the artificial intelligence radar module exceeds the predetermined threshold value, the fusion data generation unit 120 may generate fusion data based on the classification result value of the object derived through the artificial intelligence radar module 22 and the camera data derived through the artificial intelligence camera module 20.

When the fusion data are generated further based on the classification result value of the object derived through the artificial intelligence radar module, the training unit 140 may additionally input the fusion data into the artificial intelligence radar module and the artificial intelligence camera module to additionally train the artificial intelligence radar module and the artificial intelligence camera module.

The autonomous driving unit 150 may perform autonomous driving of the vehicle based on the classification result value of the object derived through the artificial intelligence radar module. For example, if a vehicle equipped with the radar apparatus 10 drives without a camera, the vehicle may transmit and receive a radar signal through the radar apparatus 10, input a radar signal reflected from an object into the artificial intelligence radar module and perform autonomous driving based on a classification result value of the object derived through the artificial intelligence radar module.

Meanwhile, it would be understood by a person with ordinary skill in the art that each of the transceiver 100, the signal processing unit 110, the fusion data generation unit 120, the classification unit 130, the training unit 140 and the autonomous driving unit 150 can be implemented separately or in combination with one another.

Figure 7:
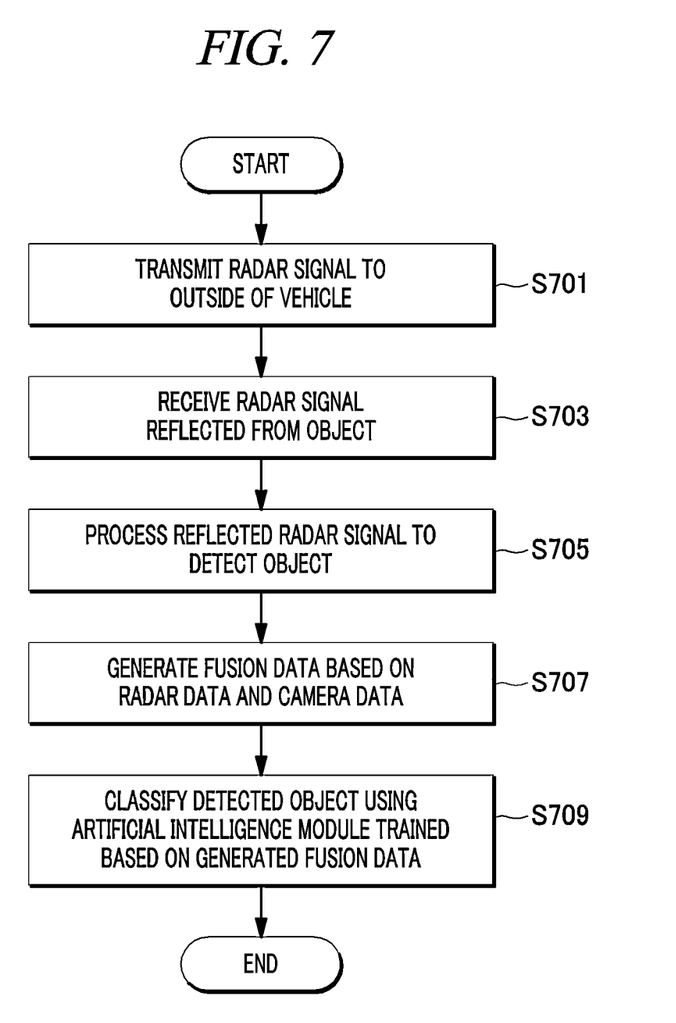
FIG. 7 is a flowchart showing a method for classifying an object by a radar apparatus installed in a vehicle according to an embodiment of the present disclosure.

FIG. 7 is a flowchart showing a method for classifying an object by the radar apparatus 10 installed in a vehicle according to an embodiment of the present disclosure.

Referring to FIG. 7, in a process S701, the radar apparatus 10 may transmit a radar signal to the outside of a vehicle.

In a process S703, the radar apparatus 10 may receive a radar signal reflected from an object.

In a process S705, the radar apparatus 10 may process the reflected radar signal to detect the object.

In a process S707, the radar apparatus 10 may generate fusion data based on radar data and camera data.

In a process S709, the radar apparatus 10 may classify the detected object through artificial intelligence modules trained based on the generated fusion data.

In the descriptions above, the processes S701 to S709 may be divided into additional processes or combined into fewer processes depending on an embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure.

Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A radar apparatus installed in a vehicle, comprising:
a transceiver that transmits a radar signal to an outside of the vehicle and receives a radar signal reflected from an object;
a signal processing unit that processes the reflected radar signal to detect the object;
a fusion data generation unit that generates fusion data based on radar data and camera data by giving different weights between the radar data and the camera data; and
a classification unit that classifies the detected object using an artificial intelligence module trained based on the generated fusion data,
wherein the radar data include data derived from the reflected radar signal, and
wherein the camera data include data derived from image data generated by a camera.

2. The radar apparatus of claim 1,
wherein the signal processing unit is further configured to:
perform a signal processing to the reflected radar signal to detect the object, and
recognize the object based on a detection result value of the object.

3. The radar apparatus of claim 2,
wherein the radar data include at least one of a fast Fourier transform value of the reflected radar signal, the detection result value of the object and a recognition result value of the object, and
the camera data include a detection result value of another object included in image data generated by the camera and a classification result value of said another object.

4. The radar apparatus of claim 3,
wherein the fusion data generation unit is further configured to match the camera data and the radar data for each target to generate the fusion data.

5. The radar apparatus of claim 4, further comprising:
a training unit that:
inputs the radar data into an artificial intelligence radar module of the radar apparatus to train the artificial intelligence radar module, and
inputs the image data into an artificial intelligence camera module of the camera to train the artificial intelligence camera module,
wherein the camera data are derived through the artificial intelligence camera module.

6. The radar apparatus of claim 5,
wherein the training unit is further configured to additionally input the fusion data into the artificial intelligence radar module and the artificial intelligence camera module to additionally train the artificial intelligence radar module and the artificial intelligence camera module.

7. The radar apparatus of claim 6,
wherein when a performance evaluation value of the artificial intelligence radar module exceeds a predetermined threshold value, the fusion data generation unit is further configured to generate the fusion data further based on a classification result value of the object derived through the artificial intelligence radar module.

8. The radar apparatus of claim 6,
wherein the classification unit is further configured to classify the detected object through the additionally trained artificial intelligence radar module.

9. The radar apparatus of claim 3,
wherein the radar signal is received while the vehicle is driving, and
the image data are generated while the vehicle equipped with the camera is driving.

10. The radar apparatus of claim 9,
wherein the fusion data generation unit is further configured to generate the fusion data by analyzing driving condition of the vehicle while the vehicle is driving and giving weightings to the camera data and the radar data based on the analyzed driving condition.

11. The radar apparatus of claim 1, further comprising:
an autonomous driving unit that performs autonomous driving of the vehicle based on a classification result value of the object.

12. A method for classifying an object by a radar apparatus installed in a vehicle,
the method comprising:
transmitting a radar signal to an outside of the vehicle;
receiving a radar signal reflected from an object;
processing the reflected radar signal to detect the object;
generating fusion data based on radar data and camera data by giving different weights between the radar data and the camera data; and
classifying the detected object using an artificial intelligence module trained based on the generated fusion data,
wherein the radar data include data derived from the reflected radar signal, and wherein the camera data include data derived from image data generated by a camera.

* * * * *